United States Patent
Li et al.

(10) Patent No.: US 8,861,034 B2
(45) Date of Patent: Oct. 14, 2014

(54) METHOD AND APPARATUS FOR GENERATING MULTI-BIT DEPTH HALFTONE AMPLITUDE-MODULATION DOTS

(75) Inventors: Haifeng Li, Beijing (CN); Bin Yang, Beijing (CN)

(73) Assignees: Peking University Founder Group Co., Ltd., Beijing (CN); Peking University, Beijing (CN); Beijing Founder Electronics Co., Ltd, Beijing (CN); Peking University Founder R & D Center, Beijing (CN)

(*) Notice: Subject to any disclaimer, the term of this patent is extended or adjusted under 35 U.S.C. 154(b) by 0 days.

(21) Appl. No.: 14/128,351

(22) PCT Filed: May 18, 2012

(86) PCT No.: PCT/CN2012/075724
§ 371 (c)(1),
(2), (4) Date: Dec. 30, 2013

(87) PCT Pub. No.: WO2013/078836
PCT Pub. Date: Jun. 6, 2013

(65) Prior Publication Data
US 2014/0132992 A1   May 15, 2014

(30) Foreign Application Priority Data
Nov. 30, 2011 (CN) .......................... 2011 1 0390759

(51) Int. Cl.
G06K 15/00 (2006.01)
H04N 1/405 (2006.01)
H04N 1/40 (2006.01)
G06K 15/02 (2006.01)

(52) U.S. Cl.
CPC .......... G06K 15/1881 (2013.01); H04N 1/4055 (2013.01); H04N 1/40087 (2013.01)
USPC ......................... 358/3.06; 358/3.01

(58) Field of Classification Search
CPC .................................................. G06K 15/1881
See application file for complete search history.

(56) References Cited

FOREIGN PATENT DOCUMENTS

| CN | 1426018 A | 6/2003 |
|---|---|---|
| CN | 1774029 A | 5/2006 |
| CN | 1913574 A | 2/2007 |
| JP | 2006086785 A | 3/2006 |

*Primary Examiner* — Barbara Reinier
*Assistant Examiner* — Christopher D Wait
(74) *Attorney, Agent, or Firm* — Garvey, Smith, Nehrbass & North, L.L.C.; Seth M. Nehrbass; Julia M. FitzPatrick

(57) ABSTRACT

The present application discloses a method and an apparatus for generating multi-bit depth halftone amplitude-modulation dots. The method may comprise: scanning an input image to obtain a value of a current pixel $P_{xy}$, where x represents a lateral position index of the current pixel, and y represents a vertical position index of the current pixel; obtaining $g_j$ from a preset multi-bit depth threshold matrix G by starting with i=0, and determining if $P_{xy}<g_j$, then providing a screening output gray level gradation value of the printer to Out=L−1−i; and otherwise, increasing i and repeating the determining and providing steps. L represents the number of a frequency-modulation screen gradation, $L=2^e$, e represents a bit depth value of the printer, i is an integer and i∈[0,L−1], h is an index number of an element g arranged sequentially in G and h is provided to h=(y % n)×m+(x % m)+i×m×n, and $g_j$ is the element value of $i_{th}$ line and $j_{th}$ row in G. The method and apparatus according to the present application can improve the speed for generating the multi-bit depth halftone amplitude-modulation dots.

8 Claims, 6 Drawing Sheets

METHOD AND APPARATUS FOR GENERATING MULTI-BIT DEPTH HALFTONE AMPLITUDE-MODULATION DOTS

TECHNICAL FIELD

The present application relates to a technical field of printing, in particular, to a method and an apparatus for generating multi-bit depth halftone amplitude-modulation dots.

BACKGROUND

The hard copying for image duplication generally relates to the screening and plate-making technology for printers and the advanced printing and plate-making device. The screening technology used for duplicating an image with hard copying is also called the digital image halftone technology. The digital image halftone technology comprises amplitude-modulation (AM) screening and frequency-modulation (FM) screening. The amplitude-modulation screening technique is also called ordered dithering of gathered dots, characterizing in that, the colored points in a produced halftone image are gathered in pairs geometrically to form clusters of colored regions, which are called dots. Since the technology controls the size of the dots to represent the gray level of the original image, the dots are called amplitude-modulation dots.

In the prior art there are some multi-bit depth imaging apparatus. The output gradations of the apparatus increase up to the power of 2 depending on the imaging depth. The general 2-bit or 4-bit output apparatus can represent 4 or 16 gradations, respectively. The final object of the multi-bit depth imaging apparatus is to obtain the output effect with high resolution under low resolution so as to overcome the problem of imaging quality under low resolution. Furthermore, in combination with the Pulse Width Modification (PWM) gradation offset technology embedded in the multi-bit depth imaging apparatus, the halftone dots are output stably and the optimized quality of the halftone dots output by the apparatus is obtained.

In view of the characteristics of the multi-bit depth apparatus, new demands and challenges for different ways of halftone screening emerge. The amplitude-modulation dot with one-bit depth is usually used in the conventional halftone screening process. Therefore, it is important for improving the high-quality amplitude-modulation effect of the multi-bit depth apparatus that how to transfer an one-bit amplitude-modulation dot data to the multi-bit amplitude-modulation dots associated with the characteristics of the apparatus, how to make full use of existing characteristics of the apparatus, and to obtain the output effect with high resolution under low resolution.

At present, image zoom technology is usually applied to achieve the multi-bit depth amplitude-modulation. With the image zooming technology, first the original one-bit depth amplitude-modulation dot data may be expanded to one-bit dot with a high resolution. Then the one-bit dot with a high resolution may be transferred to lattice data with a lower resolution supported by the current apparatus through the image zooming technology. Meanwhile, dot gradation required by the bit depth of the apparatus may be defined so as to achieve the multi-bit depth dots effect. However, it is required to transfer the dots data for many times and thus this method is too complicate to achieve and has a big problem of timeliness.

SUMMARY

The present application intents to provide a method and an apparatus for generating multi-bit depth halftone amplitude-modulation dots to solve the problem of a bad timeliness.

According to one embodiment of the present application, a method for generating multi-bit depth halftone amplitude-modulation dots is provided. The method may comprise: scanning an input image to obtain a value of a current pixel $P_{xy}$, where x represents a lateral position index of the current pixel, and y represents a vertical position index of the current pixel; obtaining $g_j$ from a preset multi-bit depth threshold matrix G by starting with i=0, and determining if $P_{xy} < g_j$, if yew, providing a screening output gray level gradation value of the printer to Out=L−1−i; otherwise, increasing i and repeating the determining and providing steps. L represents the number of a frequency-modulation screen gradation, $L=2^e$, e represents a bit depth value of the printer, i is an integer and i∈[0,L−1], h is an index number of an element g arranged sequentially in G and h is provided to h=(y % n)×m+(x % m)+i×m×n, and $g_j$ is the element value of the $i_{th}$ line and $j_{th}$ row in G.

According to another embodiment of the present application, an apparatus for generating multi-bit depth halftone amplitude-modulation dots is provided. The apparatus may comprise a scanning module, a generating module and a repeating module. The scanning module may be configured to scan an input image to obtain a value of a current pixel $P_{xy}$, where x represents a lateral position index of the current pixel, and y represents a vertical position index of the current pixel. The generating module 20 may be configured to obtain $g_j$ from a preset multi-bit depth threshold matrix G by starting with i=0. If $P_{xy} < g_j$, if yes, the generating module may further be configured to set a screening output gray level gradation value of the printer as Out=L−1−i. The repeating module may be configured to increase i and to invoke the generating module. L represents the number of a frequency-modulation screen gradation, $L=2^e$, e represents a bit depth value of the printer, i is an integer and i∈[0,L−1], h is an index number of an element g arranged sequentially in G and h is provided to h=(y % n)×m+(x % m)+i×m×n, and $g_j$ is the element value of the $i_{th}$ line and $j_{th}$ row in G.

In the embodiments of the present application, the method and the apparatus for generating multi-bit depth halftone amplitude-modulation dots can solve the problem of a bad timeliness and improve the speed for generating the multi-bit depth halftone amplitude-modulation dots without transferring the dots data for many times.

BRIEF DESCRIPTION OF THE DRAWING

The drawings described herein are used to provide a further understanding to the present application and constitute a part of this specification. Exemplary embodiments of the present application and their descriptions serve to explain the present application and do not constitute improper limitation on the present application. In the drawings

DETAILED DESCRIPTION

Hereinafter, the present application will be explained in detail with reference to the accompanying drawings in connection with the embodiments.

Figure 1:
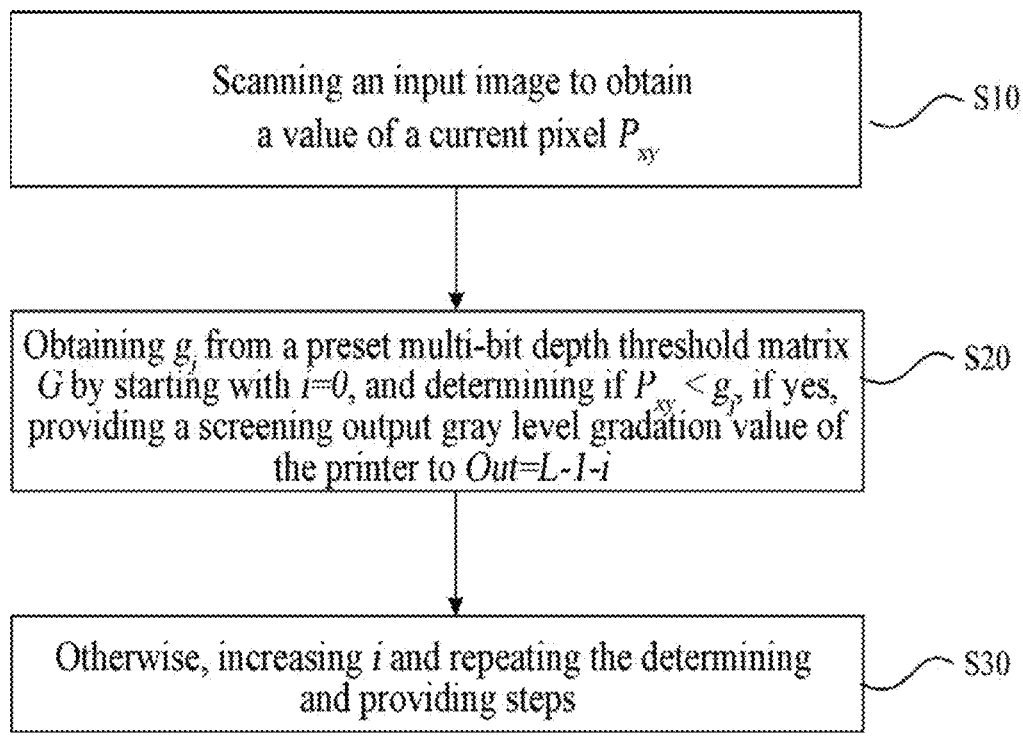
FIG. 1 is a flowchart illustrating a method for generating multi-bit depth halftone amplitude-modulation dots according to an embodiment of the present application.

FIG. 1 is a flowchart illustrating a method for generating multi-bit depth halftone amplitude-modulation dots according to an embodiment of the present application. The method may include the following steps.

Step S10: scanning an input image to obtain a value of a current pixel $P_{xy}$, where x represents a lateral position index of the current pixel, and y represents a vertical position index of the current pixel.

Step S20: obtaining $g_j$ from a preset multi-bit depth threshold matrix G by starting with i=0; if $P_{xy} < g_j$, providing a screening output gray level gradation value of the printer Out=L−1−i.

Step 320: increasing i and proceeding step S20.

L represents the number of a frequency-modulation screen gradation, $L=2^e$, where e represents a bit depth value of the printer, i is an integer and i∈[0, L−1]. h is an index number of an element g arranged sequentially in G and h is provided to h=(y % n)×m+(x % m)+i×m×n. For example, for a 3*4 matrix, the index number of element $a_{02}$ is 3, and the index number of element $a_{23}$ is 12. $g_j$ is the element value of the $i_{th}$ line and $j_{th}$ row in G.

As mentioned above, there is a need to transfer the dots data for many times in the related technology. However, according to the embodiments of the present application, the dots data does not need to be transferred for many times, such that the problem of bad timeliness can be solved. Meanwhile, the speed for generating the multi-bit depth halftone dots can be improved.

In addition, the transferred dots data in related technology belong to quasi multi-bit depth dots data, and there are too many pixels with high gray level in the center of the amplitude-modulation screen. This will result in a serious impact to subsequent color correction and saturation, and thus the transferred dots data in related technology are not real multi-bit amplitude-modulation screen to achieve a stable output quality and color quality. However, in the embodiments of the present application, the threshold matrix screening controlling gradation which has the same number as the bit depth gradation of the apparatus can be used to achieve a stable output quality and color quality.

Preferably, the multi-bit depth threshold matrix G is preset to:

$$\begin{bmatrix} \text{Line 1: } g_1, g_2, g_3, \ldots g_{n \times m} \\ \text{Line 2: } g_{n \times m+1}, g_{n \times m+2}, g_{n \times m+3} \cdots g_{2 \times (n \times m)} \\ \vdots \\ \text{Line } i\colon \ldots g_j \\ \text{Line } i\text{-1: } g_{(L-2) \times (n \times m)+1}, g_{(L-2) \times (n \times m)+2} \cdots g_{(L-1) \times (n \times m)} \end{bmatrix}$$

where m represents a width of the matrix, and n represents a height of the matrix.

Preferably, the presetting step of the multi-bit depth threshold matrix G may include the following steps.

Step 1): setting initial parameters as follows:

a) M=(L−1)×n×m, where M represents the maximum of G;

b) setting (L−1) cumulative arrays $S_i$ and initializing $S_i$ to $S_i$=0; meanwhile, setting an index I of the cumulative arrays and the initial value of the index I is 0;

c) setting a cumulative value of the threshold to C and the initial value of the threshold is 1.

Step 2): transferring logic are given as follows:

a) setting $a=a_{xy}$, where x=I % m, if x>$U_i$, x=$U_i$, y=I(L−1); and when I % (n×m)=0, i=i+1, % represents a modulo operation, $a_{xy}$ represents a value of an element in $x_{th}$ line and $y_{th}$ row in a permutation matrix $A_i$, $U_i$ represents the number of elements in $i_{th}$ line in the matrix $A_i$;

b) when $a_{xy} \le$(L−1) and $S_a <$(m×n), proceeding the following operations:

traversing each value in a preset initial halftone one-bit amplitude-modulation screen threshold matrix T until $t_{ru}=S_a$, where $t_{ru}$ represents a value of an element in $r_{th}$ line and $u_{th}$ row in T;

setting $g_j$=C in the $i_{th}$ line of G, where j=u×m+r;

increasing the threshold cumulative value C: C=C+1;

increasing the cumulative array $S_a$: $S_a=S_a+1$;

correcting a=L−1, if it is not satisfied with the condition $a_{xy} \le$(L−1) and $S_a <$(m×n);

c) setting I=I+1;

d) repeating the steps (a) to (c) until C>M, and then ending the operations.

Preferably, the initial halftone one-bit amplitude-modulation screen threshold matrix T is preset to:

$$\begin{bmatrix} t_{11}, t_{12}, t_{13}, \ldots t_{1m} \\ t_{21}, t_{22}, t_{23}, \ldots t_{2m} \\ \vdots \\ t_{xy} \\ \vdots \\ t_{n1}, t_{n2}, t_{n3}, \ldots t_{nm} \end{bmatrix}$$

where $t_{xy} \in$[1,m×n] and $t_{xy}$ in the matrix meets element anisotropy for each two.

The permutation matrix $A_i$ is preset to:

$$\begin{bmatrix} \text{Line 0: } a_{01}, a_{02}, a_{03}, \ldots a_{0U_0}, \\ \text{Line 1: } a_{11}, a_{12}, a_{13}, \ldots a_{1(U_1-L+1)}, \\ \vdots \\ \text{Line } i\text{: } a_{i1}, a_{i2}, a_{i3}, \ldots a_{xy}, \ldots a_{iU_i}, \\ \vdots \\ \text{Line } L-3\text{: } a_{(L-3)1}, a_{(L-3)2}, a_{(L-3)3}, a_{(L-3)4}, \\ \text{Line } L-2\text{: } a_{(L-2)1}, a_{(L-2)2}, a_{(L-3)3}, a_{(L-3)4}, \\ \text{Line } L-1\text{: } a_{(L-1)1} \end{bmatrix}$$

where
1) $a_{i1} = a_{i2} = a_{i3} = \ldots = a_{iU_i} = i$
2) the number of elements in each line decreases from line 0 to line L−1, and $(U_{i-1} - U_i) - (U_i - U_{i+1}) = 1$.

Figure 2:
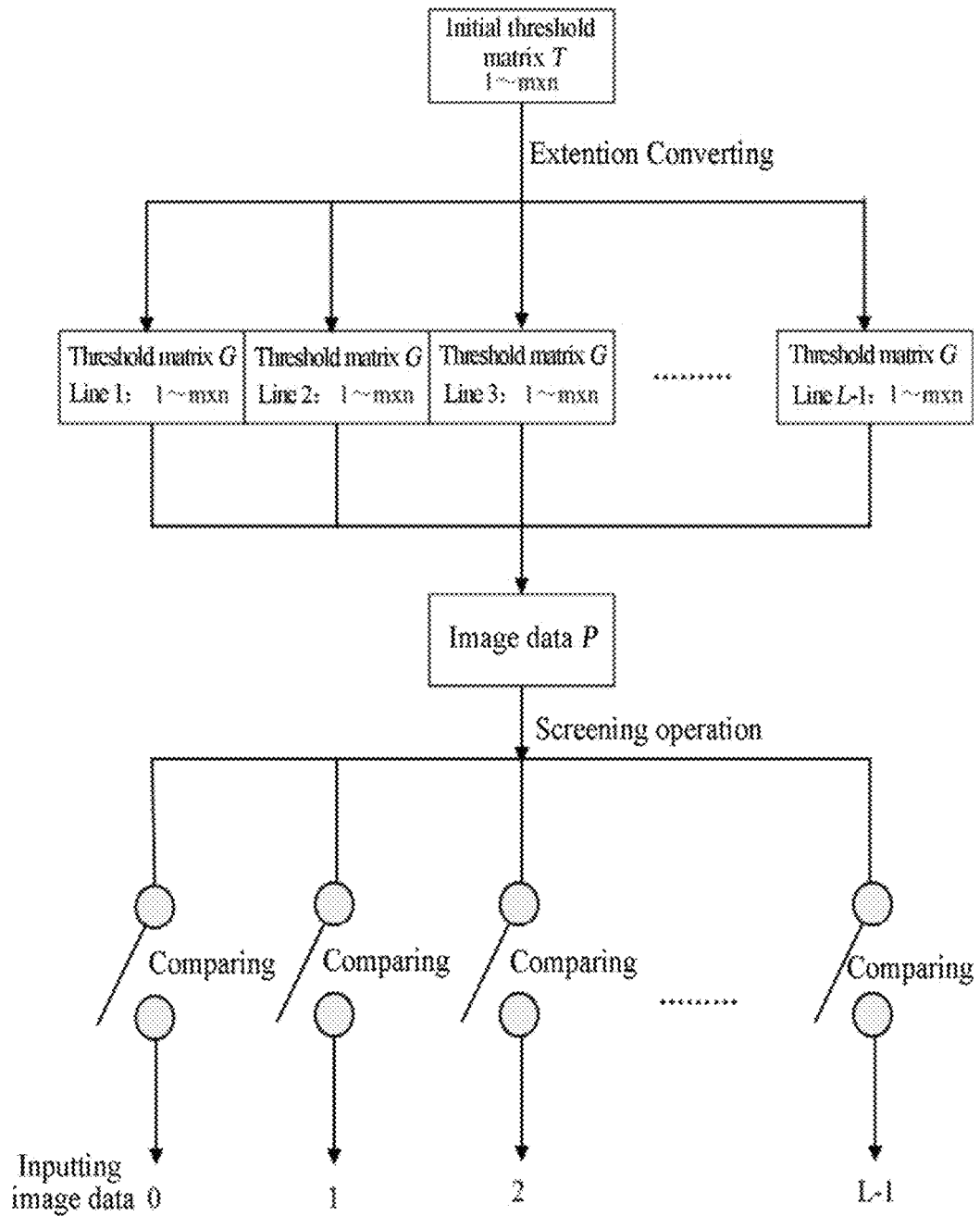
FIG. 2 is a principle diagram illustrating a method for generating multi-bit depth amplitude-modulation screening gradation according to a preferable embodiment of the present application.

According to the preferable embodiments of the present application, the flowchart of the method for generating multi-bit depth halftone dots is shown in FIG. 2.

Figure 3:
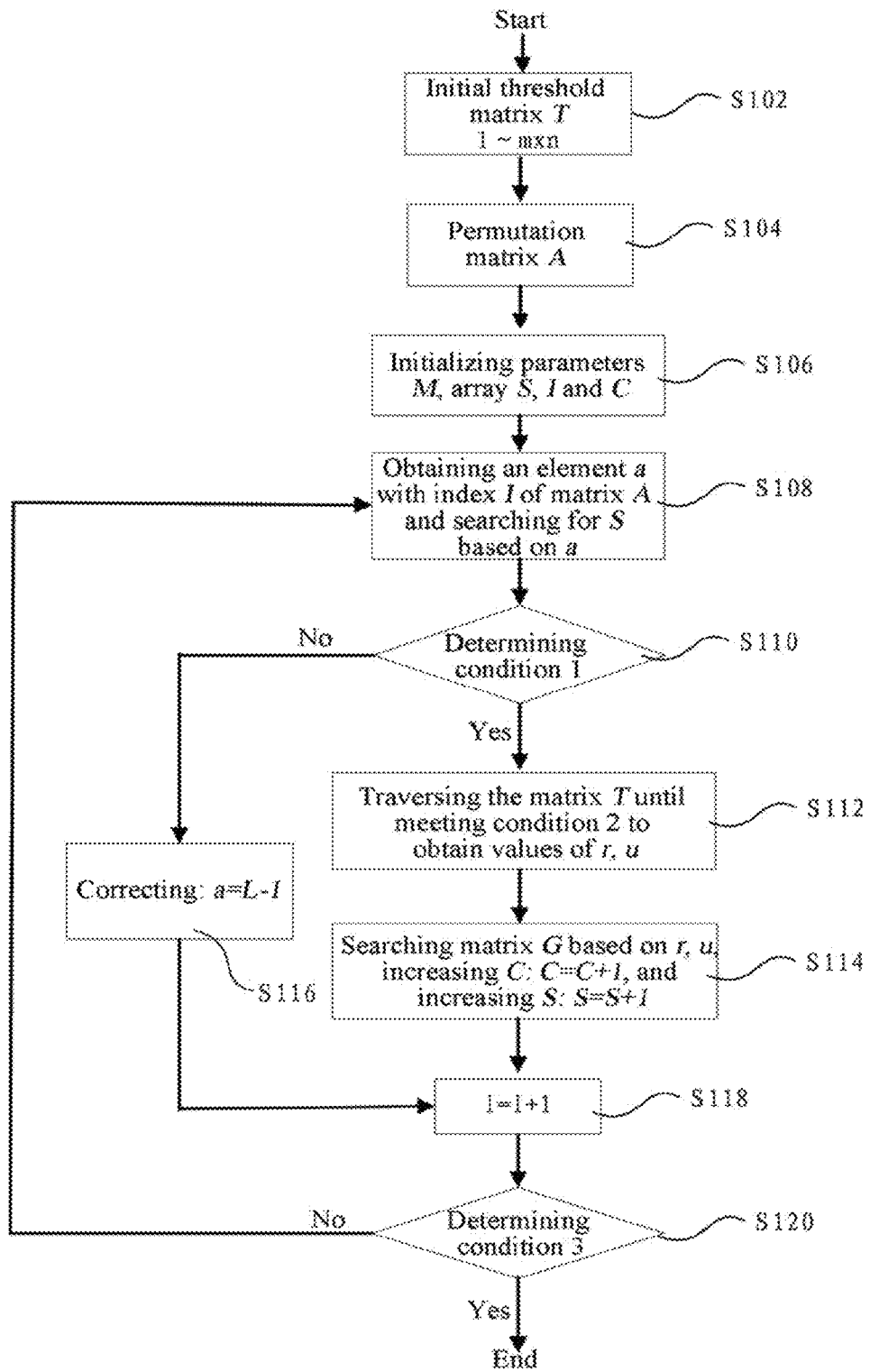
FIG. 3 is a flowchart illustrating a method for transferring a single threshold matrix to a multi-bit depth threshold matrix according to a preferable embodiment of the present application.

FIG. 3 is a flowchart illustrating a method for transferring a single threshold matrix to a multi-bit depth threshold matrix according to a preferable embodiment of the present application. The method may include the following steps.

Step S102: providing the initial halftone one-bit amplitude-modulation screen threshold matrix T $$\begin{bmatrix} t_{11}, t_{12}, t_{13}, \ldots t_{1m} \\ t_{21}, t_{22}, t_{23}, \ldots t_{2m} \\ \vdots \\ t_{xy} \\ \vdots \\ t_{n1}, t_{n2}, t_{n3}, \ldots t_{nm} \end{bmatrix}$$

where $t_{xy}$ is corresponding to a single element in the matrix; x and y represent indexes of a lateral and a vertical position, respectively; m represents a width of the matrix, n represents a height of the matrix, for example, m=n=32; $t_{xy} \in [1, m \times n]$ and the elements in the matrix meet element anisotropy for each two.

Figure 4:
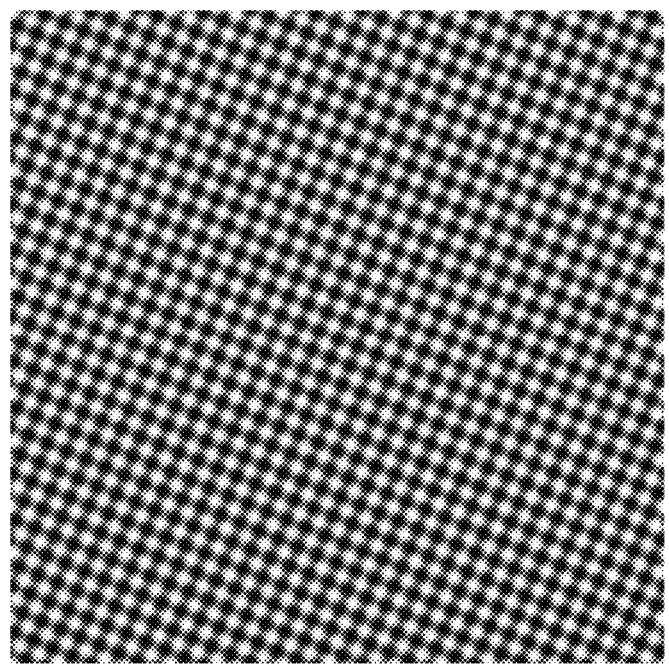
FIG. 4 is a schematic diagram illustrating effect of an input dot threshold matrix according to a preferable embodiment of the present application.

Parameters of the banner screen threshold matrix applied in the embodiment are given to m=n=226, data effect of dot threshold matrix is shown in FIG. 4.

The initial halftone one-bit amplitude-modulation screen threshold matrix T is known to one skilled in the art. The threshold matrix T description cover all related or similar data when it is taken as an input parameter of the process of the present application.

Step S104: calculating the gradation number L of the frequency-modulation screen based on bit depth value e of the apparatus via $L = 2^e$, in which the step S104 may further include:

generating the permutation matrix $A_i$ based on the value L, and permutation matrix $A_i$ is preset to:

$$\begin{bmatrix} \text{Line 0: } a_{01}, a_{02}, a_{03}, \ldots a_{0U_0}, \\ \text{Line 1: } a_{11}, a_{12}, a_{13}, \ldots a_{1(U_1-L+1)}, \\ \vdots \\ \text{Line } i\text{: } a_{i1}, a_{i2}, a_{i3}, \ldots a_{xy}, \ldots a_{iU_i}, \\ \vdots \\ \text{Line } L-3\text{: } a_{(L-3)1}, a_{(L-3)2}, a_{(L-3)3}, a_{(L-3)4}, \\ \text{Line } L-2\text{: } a_{(L-2)1}, a_{(L-2)2}, a_{(L-3)3}, a_{(L-3)4}, \\ \text{Line } L-1\text{: } a_{(L-1)1} \end{bmatrix}$$

where i is an integer and $i \in [0, L-1]$; $U_i$ represents the number of elements in $i_{th}$ line; $a_{xy}$ represents any element in the permutation matrix $A_i$; x represents the line index and y represents the serial number in each line from left to right.

Furthermore, the elements in the permutation matrix $A_i$ meet the following conditions:

1) $a_{i1} = a_{i2} = a_{i3} = \ldots = a_{iU_i} = i$
2) the number of elements in each line decreases from line 0 to line L−1, and $(U_{i-1} - U_i) - (U_i - U_{i+1}) = 1$.

In the embodiment, the bit depth of the apparatus is set to e=3, i.e. 3-bit depth, L is set to 8, and thus the permutation matrix $A_i$ can be calculated to:

$$\begin{bmatrix} 0,0,0,0,0,0,0,0,0,0,0,0,0,0,0,0,0,0,0,0,0,0,0,0,0,0,0,0, \\ 1,1,1,1,1,1,1,1,1,1,1,1,1,1,1,1,1,1,1,1,1,1, \\ 2,2,2,2,2,2,2,2,2,2,2,2,2,2,2,2, \\ 3,3,3,3,3,3,3,3,3,3, \\ 4,4,4,4,4,4,4,4,4, \\ 5,5,5,5, \\ 6,6, \\ 7 \end{bmatrix}$$

Then, the threshold matrix T is transferred to multi-bit depth threshold matrix G through the permutation matrix $A_i$, and the matrix G is set to $$\begin{bmatrix} \text{Line 1: } g_1, g_2, g_3, \ldots g_{n \times m} \\ \text{Line 2: } g_{n \times m+1}, g_{n \times m+2}, g_{n \times m+3} \cdots g_{2 \times (n \times m)} \\ \vdots \\ \text{Line } i\text{: } \ldots g_j \\ \text{Line } i\text{-1: } g_{(L-2) \times (n \times m)+1}, g_{(L-2) \times (n \times m)+2} \cdots g_{(L-1) \times (n \times m)} \end{bmatrix}$$

in which there are n×m elements in each line, and $g_j$ represent an element in $i_{th}$ line.

The specific transferring steps are given as follows.

Step S106: setting initial parameters as follows:
a) M=(L−1)×n×m, where M represents the maximum of G;
b) setting (L−1) cumulative arrays $S_i$ and initialize $S_i$ to $S_i$=0 (i∈[0,L−1]); meanwhile, setting an index I of the cumulative arrays and the initial value of the index I is 0;
c) setting a cumulative value of the threshold to C and the initial value of the threshold is 1.

Step S108: obtaining a permutation matrix element a of the index I of the current cumulative array, a=$a_{xy}$, and searching for S based on the element a, where x=I % m, if x>$U_i$, x=$U_i$, y=I(L−1); and when I %(n×m)=0, i=i+1, % represents a modulo operation.

Step S110: when $a_{xy}$≤(L−1) and $S_a$<(m×n) (condition 1), proceeding the following operations.

Step S112: traversing each value in the matrix T until $t_{ru}$=$S_a$ (condition 2), where r and u correspond to indexes in T in X and Y directions, respectively.

Step S114: setting $g_j$=C in the $i_{th}$ line of the threshold matrix G, and when j=u×m+r, increasing the threshold cumulative value C: C=C+1, and increasing the cumulative array $S_a$: $S_a$=$S_a$+1.

Step S116: if the condition 1 is not satisfied, then correcting a according to a=L−1.

Step S118: increasing the index I of the current cumulative array I=I+1.

Step S120: repeating the steps S108 to S118 until C>M (condition 3), and then ending the operations.

Figure 5:
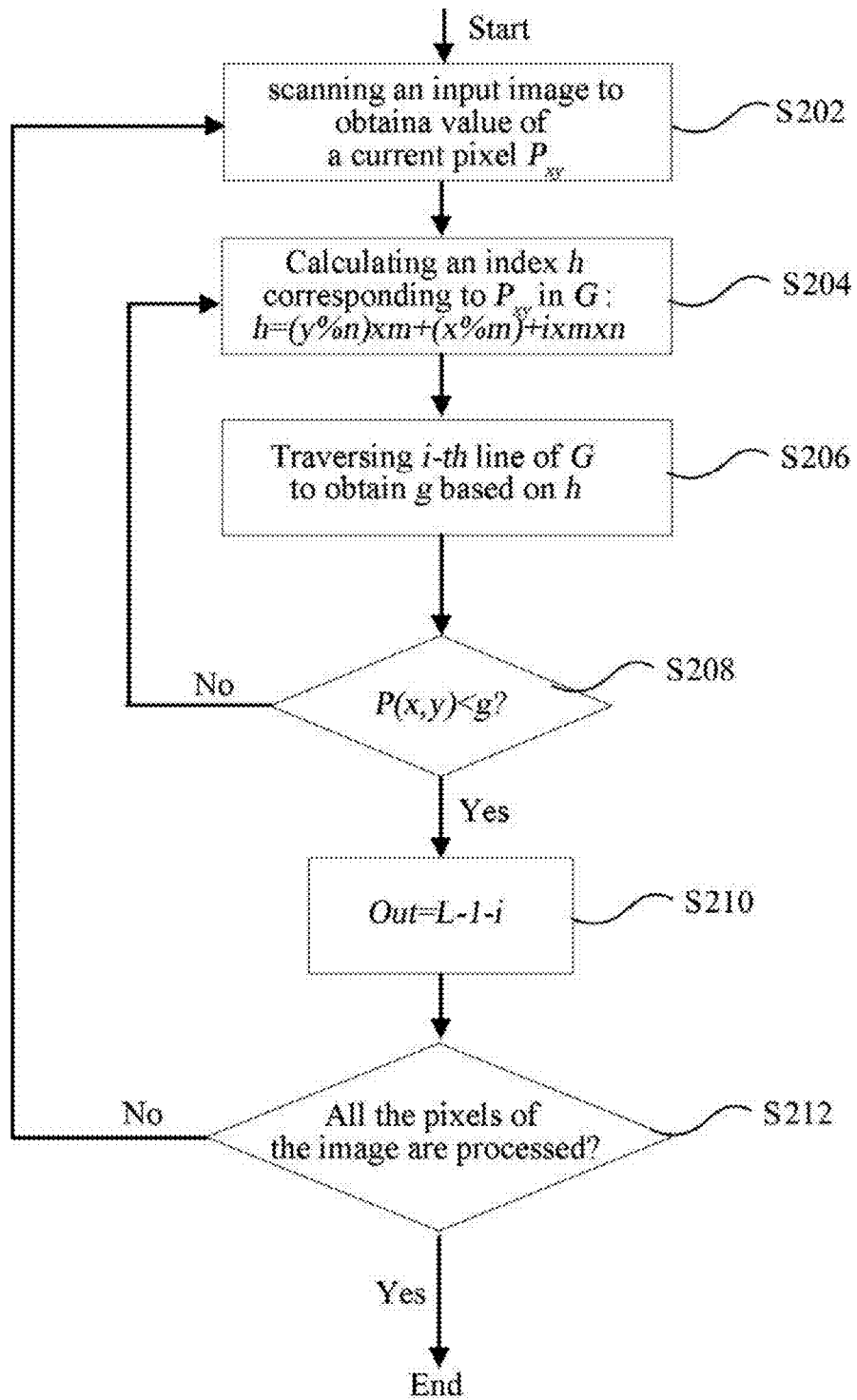
FIG. 5 is a flowchart illustrating a multi-bit depth amplitude-modulation threshold screening method according to a preferable embodiment of the present application.

Next, image thresholds are compared by using the multi-bit depth threshold matrix G, and the corresponding screening data are output. FIG. 5 shows the flowchart of screening process, and the screening process may include the following steps.

Step S202: scanning an input image to obtain a value of a current pixel $P_{xy}$, where x represents a lateral position index of the current pixel, and y represents a vertical position index of the current pixel.

Step S204: calculating an index h corresponding to the current pixel $P_{xy}$ in the multi-bit depth threshold matrix G according to h=(y % n)×m+(x % m)+i×m×n, where i represents the $i_{th}$ line in the threshold matrix G and i∈[0, L−1].

Step S206: traversing the multi-bit depth threshold matrix G, and obtaining the threshold $g_j$ corresponding to the matrix G based on the index h.

Step S208: comparing the screening threshold under the condition $P_{xy}$<$g_j$ (condition 4).

Step S210: if $P_{xy}$<$g_j$, then Out=L−1−i; otherwise, repeating the steps S204 to S206 until $P_{xy}$<$g_j$, where Out represents the screening output gray level gradation, and Out∈[0,L−1].

Step S212: determining whether all the pixels of the image are processed, if not, returning to the step S202, otherwise, ending the process.

Figure 6:
FIG. 6 is an effect diagram illustrating 3-bit amplitude-modulation screening output dots according to a preferable embodiment of the present application.

According to the embodiment, final halftone 3-bit dots are output through the above transferring and calculating steps. FIG. 6 shows a screening effect diagram.

Figure 7:
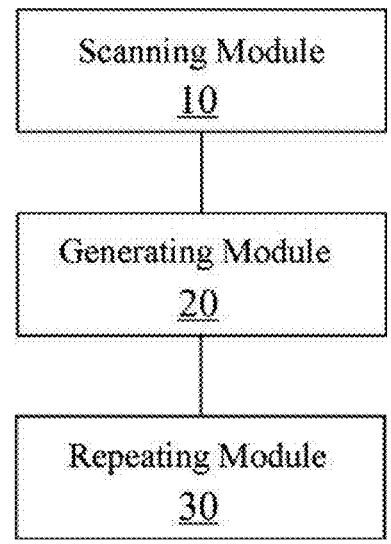
FIG. 7 is a schematic diagram illustrating an apparatus for generating multi-bit depth halftone amplitude-modulation dots according to an embodiment of the present application.

FIG. 7 is a schematic diagram illustrating an apparatus for generating multi-bit depth halftone amplitude-modulation dots according to an embodiment of the present application, and the apparatus may include a scanning module 10, a generating module 20 and a repeating module 30.

The scanning module 10 may be configured to scan an input image to obtain a value of a current pixel $P_{xy}$, where x represents a lateral position index of the current pixel, and y represents a vertical position index of the current pixel.

The generating module 20 may be configured to obtain $g_j$ from a preset multi-bit depth threshold matrix G by starting with i=0. If $P_{xy}$<$g_j$, then the generating module 20 may further be configured to set a screening output gray level gradation value of the printer to Out=L−1−i.

The repeating module 30 may be configured to increase i and to invoke the generating module 20.

L represents the number of a frequency-modulation screen gradation, L=$2^e$, where e represents a bit depth value of the printer, $g_j$ is the element value of the $i_{th}$ line and $j_{th}$ row in G, and i is an integer and i∈[0, L−1].

In view of the above, based on the existing halftone amplitude-modulation screening data obtained by searching in the threshold matrix, the characteristics of the multi-bit imaging apparatus can be used to their full potential according to requirements for dots. With the method and apparatus according to the present application, the output device with a multi-bit depth imaging depth can output a level full multi-bit halftone image with a high quality. Furthermore, the phenomenon of contour jaggies of the one-bit depth apparatus can be effectively resolved in order to output the amplitude-modulation dots with high resolution under low resolution.

It will be readily apparent to those skilled in the art that the modules or steps of the present application may be implemented with a common computing device. In addition, the modules or steps of the present application can be concentrated or run in a single computing device or distributed in a network composed of multiple computing devices. Optionally, the modules or steps may be achieved by using codes of the executable program, so that they can be stored in the storage medium, or the plurality of the modules or steps can be fabricated into an individual integrated circuit module. Therefore, the present application is not limited to any particular hardware, software or combination thereof.

The foregoing is only preferred embodiments of the present application, and it is not intended to limit the present application. Moreover, it will be apparent to those skilled in the art that various modifications and variations can be made to the present application. Thus, any modifications, equivalent substitutions, improvements etc. within the spirit and principle of the present application should be included within the scope of protection of the application.

What is claimed is:

1. A method for generating multi-bit depth halftone amplitude-modulation dots comprising:

scanning an input image to obtain a value of a current pixel $P_{xy}$, where x represents a lateral position index of the current pixel, and y represents a vertical position index of the current pixel;

obtaining $g_j$ from a preset multi-bit depth threshold matrix G by starting with i=0, and determining if $P_{xy}$<$g_j$, if yes, providing a screening output gray level gradation value of a printer Out=L−1−i; otherwise, increasing i and repeating the determining and providing steps;

where L represents the number of a frequency-modulation screen gradation, L=$2^e$, e represents a bit depth value of the printer, i is an integer and i∈[0,L−1], h is an index number of an element g arranged sequentially in G and h is provided as h=(y % n)×m+(x % m)+i×m×n, and $g_j$ is an element value of $i_{th}$ line and $j_{th}$ row in G.

2. The method according to claim 1, wherein the multi-bit depth threshold matrix G is preset as $$\begin{bmatrix} \text{Line 1: } g_1, g_2, g_3, \ldots g_{n \times m} \\ \text{Line 2: } g_{n \times m+1}, g_{n \times m+2}, g_{n \times m+3} \cdots g_{2 \times (n \times m)} \\ \vdots \\ \text{Line i: } \ldots g_j \\ \text{Line i-1: } g_{(L-2) \times (n \times m)+1}, g_{(L-2) \times (n \times m)+2} \cdots g_{(L-1) \times (n \times m)} \end{bmatrix},$$

where m represents a width of the matrix, and n represents a height of the matrix.

3. The method according to claim 2, wherein the multi-bit depth threshold matrix G is preset by:
1) setting initial parameters, comprising:
  a) M=(L−1)×n×m, where M represents a maximum of G;
  b) setting (L−1) cumulative arrays $S_i$ and initializing $S_i$ to $S_i$=0; meanwhile, setting an index I of the cumulative arrays and an initial value of the index I is 0;
  c) setting a cumulative threshold as C and the initial value of C is 1;
2) transferring logic are given as follows:
  a) setting a=$a_{xy}$,
  where x=I % m, if x>$U_i$, x=$U_i$, y=I(L−1);
  when I %(n×m)=0, i=i+1, wherein % represents a modulo operation,
  $a_{xy}$ represents a value of an element in $x_{th}$ line and $y_{th}$ row in a permutation matrix $A_i$, $U_i$ represents a number of elements in $i_{th}$ line in the matrix $A_i$;
  b) when $a_{xy}$≤(L−1) and $S_a$<(m×n), proceeding the following operations:
    traversing each value in a preset initial halftone one-bit amplitude-modulation screen threshold matrix T until $t_{ru}$=$S_a$, where $t_{ru}$ represents a value of an element in $r_{th}$ line and $u_{th}$ row in T;
    setting $g_j$=C in $i_{th}$ line of G, where j=u×m+r;
    increasing the threshold cumulative value C: C=C+1;
    increasing the cumulative array $S_a$: $S_a$=$S_a$+1;
    correcting a=L−1 if it is not satisfied with a condition of $a_{xy}$≤(L−1) and $S_a$<(m×n);
  c) setting I=I+1;
  d) repeating the steps (a) to (c) until C>M, and then ending the operations.

4. The method according to claim 3, wherein the initial halftone one-bit amplitude-modulation screen threshold matrix T is preset as $$\begin{bmatrix} t_{11}, t_{12}, t_{13}, \ldots t_{1m} \\ t_{21}, t_{22}, t_{23}, \ldots t_{2m} \\ \vdots \\ t_{xy} \\ \vdots \\ t_{n1}, t_{n2}, t_{n3}, \ldots t_{nm} \end{bmatrix}$$

where $t_{xy} \in [1, m \times n]$ and $t_{xy}$ in the matrix T meets element anisotropy for each two; and the permutation matrix $A_i$ is preset to $$\begin{bmatrix} \text{Line 0: } a_{01}, a_{02}, a_{03}, \ldots a_{0U_0}, \\ \text{Line 1: } a_{11}, a_{12}, a_{13}, \ldots a_{1(U_1-L+1)}, \\ \vdots \\ \text{Line i: } a_{i1}, a_{i2}, a_{i3}, \ldots a_{xy}, \ldots a_{iU_i}, \\ \vdots \\ \text{Line } L-3: a_{(L-3)1}, a_{(L-3)2}, a_{(L-3)3}, a_{(L-3)4}, \\ \text{Line } L-2: a_{(L-2)1}, a_{(L-2)2}, a_{(L-3)3}, a_{(L-3)4}, \\ \text{Line } L-1: a_{(L-1)1} \end{bmatrix}$$

wherein
1) $a_{i1}=a_{i2}=a_{i3}=\ldots=a_{iU_i}=i$
2) the number of elements in each line decreases from line 0 to line L−1, and $(U_{i-1}-U_i)-(U_i-U_{i+1})=1$.

5. An apparatus for generating multi-bit depth halftone amplitude-modulation dots, comprising:
a scanning module configured to scan an input image to obtain a value of a current pixel $P_{xy}$, wherein x represents a lateral position index of the current pixel, and y represents a vertical position index of the current pixel;
a generating module configured to obtain $g_i$ from a preset multi-bit depth threshold matrix G by starting with i=0, if $P_{xy}$<$g_j$, then the generating module is further configured to set a screening output gray level gradation value of a printer as Out=L−1−i; and
a repeating module configured to increase i and to invoke the generating module;
wherein L represents number of a frequency-modulation screen gradation, L=$2^e$, e represents a bit depth value of the printer, i is an integer and i∈[0,L−1], h is an index number of an element g arranged sequentially in G and h is provided to h=(y % n)×m+(x % m)+i×m×n, and $g_j$ is an element value of the $i_{th}$ line and $j_{th}$ row in G.

6. The apparatus according to claim 5, wherein the multi-bit depth threshold matrix G is preset as $$\begin{bmatrix} \text{Line 1: } g_1, g_2, g_3, \ldots g_{n \times m} \\ \text{Line 2: } g_{n \times m+1}, g_{n \times m+2}, g_{n \times m+3} \cdots g_{2 \times (n \times m)} \\ \vdots \\ \text{Line i: } \ldots g_j \\ \text{Line i-1: } g_{(L-2) \times (n \times m)+1}, g_{(L-2) \times (n \times m)+2} \cdots g_{(L-1) \times (n \times m)} \end{bmatrix},$$

where m represents a width of the matrix, and n represents a height of the matrix.

7. The apparatus according to claim 6, wherein the presetting step of the multi-bit depth threshold matrix G comprises:
1) setting initial parameters comprising:
  a) M=(L−1)×n×m, where M represents the maximum of G;
  b) setting (L−1) cumulative arrays $S_i$ and initializing $S_i$ to $S_i$=0; meanwhile, setting an index I of the cumulative arrays and an initial value of the index I is 0;
  c) setting a cumulative threshold as C and the initial value of the threshold C is 1;
2) transferring logic are given as follows:
  a) setting a=$a_{xy}$, where x=I % m, if x>$U_i$, x=$U_i$, y=I(L−1); and when I %(n×m)=0, i=i+1, % represents a modulo operation, $a_{xy}$ represents a value of an element in $x_{th}$ line and $y_{th}$ row in a permutation matrix $A_i$, $U_i$ represents the number of elements in $i_{th}$ line in the matrix $A_i$;
  b) when $a_{xy}$≤(L−1) and $S_a$<(m×n), proceeding the following operations:
    traversing each value in a preset initial halftone one-bit amplitude-modulation screen threshold matrix T until $t_{ru}=S_a$, where $t_{ru}$ represents a value of an element in $r_{th}$ line and $u_{th}$ row in T;

setting $g_j=C$ in the $i_{th}$ line of G, where $j=u\times m+r$;

increasing the threshold cumulative value C: $C=C+1$;

increasing the cumulative array $S_a$: $S_a=S_a+1$;

correcting $a=L-1$, if it is not satisfied with the condition of $a_{xy}\leq(L-1)$ and $S_a<(m\times n)$;

c) setting $I=I+1$;

d) repeating the steps (a) to (c) until $C>M$, and then ending the operations.

8. The apparatus according to claim 7, wherein the initial halftone one-bit amplitude-modulation screen threshold matrix T is preset as $$\begin{bmatrix} t_{11}, t_{12}, t_{13}, \ldots t_{1m} \\ t_{21}, t_{22}, t_{23}, \ldots t_{2m} \\ \vdots \\ t_{xy} \\ \vdots \\ t_{n1}, t_{n2}, t_{n3}, \ldots t_{nm} \end{bmatrix}$$

where $t_{xy}\in[1,m\times n]$ and $t_{xy}$ in the matrix meets element anisotropy for each two; and the permutation matrix $A_i$ is preset to $$\begin{bmatrix} \text{Line } 0: a_{01}, a_{02}, a_{03}, \ldots a_{0U_0}, \\ \text{Line } 1: a_{11}, a_{12}, a_{13}, \ldots a_{1(U_1-L+1)}, \\ \vdots \\ \text{Line } i: a_{i1}, a_{i2}, a_{i3}, \ldots a_{xy}, \ldots a_{iU_i}, \\ \vdots \\ \text{Line } L-3: a_{(L-3)1}, a_{(L-3)2}, a_{(L-3)3}, a_{(L-3)4}, \\ \text{Line } L-2: a_{(L-2)1}, a_{(L-2)2}, a_{(L-3)3}, a_{(L-3)4}, \\ \text{Line } L-1: a_{(L-1)1} \end{bmatrix}$$

wherein

1) $a_{i1}=a_{i2}=a_{i3}=\ldots=a_{iU_i}=i$
2) the number of elements in each line decreases from line 0 to line L-1, and $(U_{i-1}-U_i)-(U_i-U_{i+1})=1$.

* * * * *